US009690045B2

United States Patent
Goodwill et al.

(10) Patent No.: US 9,690,045 B2
(45) Date of Patent: Jun. 27, 2017

(54) APPARATUS AND METHOD FOR A WAVEGUIDE POLARIZER COMPRISING A SERIES OF BENDS

(71) Applicant: Huawei Technologies Co., Ltd., Shenzhen (CN)

(72) Inventors: Dominic John Goodwill, Ottawa (CA); Jia Jiang, Kanata (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 21 days.

(21) Appl. No.: 14/231,429

(22) Filed: Mar. 31, 2014

(65) Prior Publication Data
US 2015/0277042 A1    Oct. 1, 2015

(51) Int. Cl.
G02B 6/00    (2006.01)
*G02B 6/126*    (2006.01)
*H04B 10/60*    (2013.01)
G02B 6/13    (2006.01)

(52) U.S. Cl.
CPC ............. *G02B 6/126* (2013.01); *H04B 10/60* (2013.01); *G02B 6/13* (2013.01)

(58) Field of Classification Search
CPC ........ G02B 6/126; G02B 6/105; G02B 6/272; G02F 1/093; H04B 10/2569
USPC .............................................. 385/1, 2, 3, 11
See application file for complete search history.

(56) References Cited

U.S. PATENT DOCUMENTS

| | | | |
|---|---|---|---|
| 4,084,130 A * | 4/1978 | Holton | G02B 6/30 257/E27.12 |
| 4,998,793 A | 3/1991 | Henry et al. | |
| 5,436,992 A | 7/1995 | Wang et al. | |
| 5,475,771 A | 12/1995 | Hosoi | |
| 5,838,844 A * | 11/1998 | Van Dam | G02B 6/12011 385/11 |
| 5,946,434 A | 8/1999 | Lee | |
| 6,324,312 B1 | 11/2001 | Liao et al. | |
| 2005/0025427 A1 | 2/2005 | Dougherty et al. | |

(Continued)

FOREIGN PATENT DOCUMENTS

CN    202661674 U    1/2013

OTHER PUBLICATIONS

International Search Report and Written Opinion received in International Application No. PCT/CN2015/074477 mailed Jun. 24, 2015, 12 pages.

(Continued)

*Primary Examiner* — Jennifer Doan
(74) *Attorney, Agent, or Firm* — Slater Matsil, LLP

(57) ABSTRACT

Embodiments are provided for a waveguide polarizer comprising a series of bends. The waveguide polarizer is suitable for used in optical waveguide devices or circuits, where a polarized light is required, such as for single polarization output. The polarizer design is independent of the function of the optical devices. In an embodiment, an optical polarizer comprises an optical waveguide configured to propagate light at a designated polarization mode, and comprising a bend in a same plane of the propagated light. The bend has a geometry configured to contain in the optical waveguide the designated polarization mode of the propagated light and radiate outside the optical waveguide a second polarization mode of the propagated light.

22 Claims, 4 Drawing Sheets

(56) References Cited

U.S. PATENT DOCUMENTS

2009/0190876 A1 7/2009 Doi
2012/0288229 A1 11/2012 Doerr et al.

OTHER PUBLICATIONS

Alam, M. Z., et al., "Compact and Silicon-on-Insulator-Compatible Hybrid Plasmonic TE-pass Polarizer," Optics Letters vol. 37, No. 1, Jan. 1, 2012, pp. 55-57.

Avrutsky, Ivan, "Integrated Optical Polarizer for Silicon-on-Insulator Waveguides Using Evanescent Wave Coupling to Gap Plasmon-Polaritons," IEEE Journal of Selected Topics in Quantum Electronics, vol. 14, No. 6, Nov./Dec. 2008, pp. 1509-1514.

Huang, Ying, et al., "CMOS Compatible Horizontal Nanoplasmonic Slot Waveguides TE-pass Polarizer on Siliconon-Insulator Platform," Optics Express, vol. 21, No. 10, pp. May 20, 2013, pp. 12790-12796.

Sacher, Wesley, D., et al. "Si3N•4-on-SOI Polarization Rotator-Splitter Based on TM0-TE1 Mode Conversion." OFC, Jan. 2014. Paper Th1A.3.32.

Sacher, Wesley D., et al., "Silicon-on-Insulator Polarization Splitter-Rotator Based on TM0-TE1 Mode Conversion in a Bi-level Taper," in Conference on Lasers and Electro-Optics, OSA Technical Digest, Jun. 2013, 2 pages.

Taillaert, Dirk, et al., "A Compact Two-Dimensional Grating Coupler Used as a Polarization Splitter," IEEE Photonics Technology Letters, vol. 15, No. 9, pp. 1249-1251, Sep. 2003.

Wang, Qian, et al., "Ultracompact TM-Pass Silicon Nanophotonic Waveguide Polarizer and Design," IEEE Photonics Journal, vol. 2, No. 1, Feb. 2010, pp. 49-56.

Bauters, J., et al., "Ultralow-loss Planar Si3N4 Waveguide Polarizers", IEEE Photonics Journal, vol. 5, No. 1, Feb. 2013, 8 pages.

\* cited by examiner

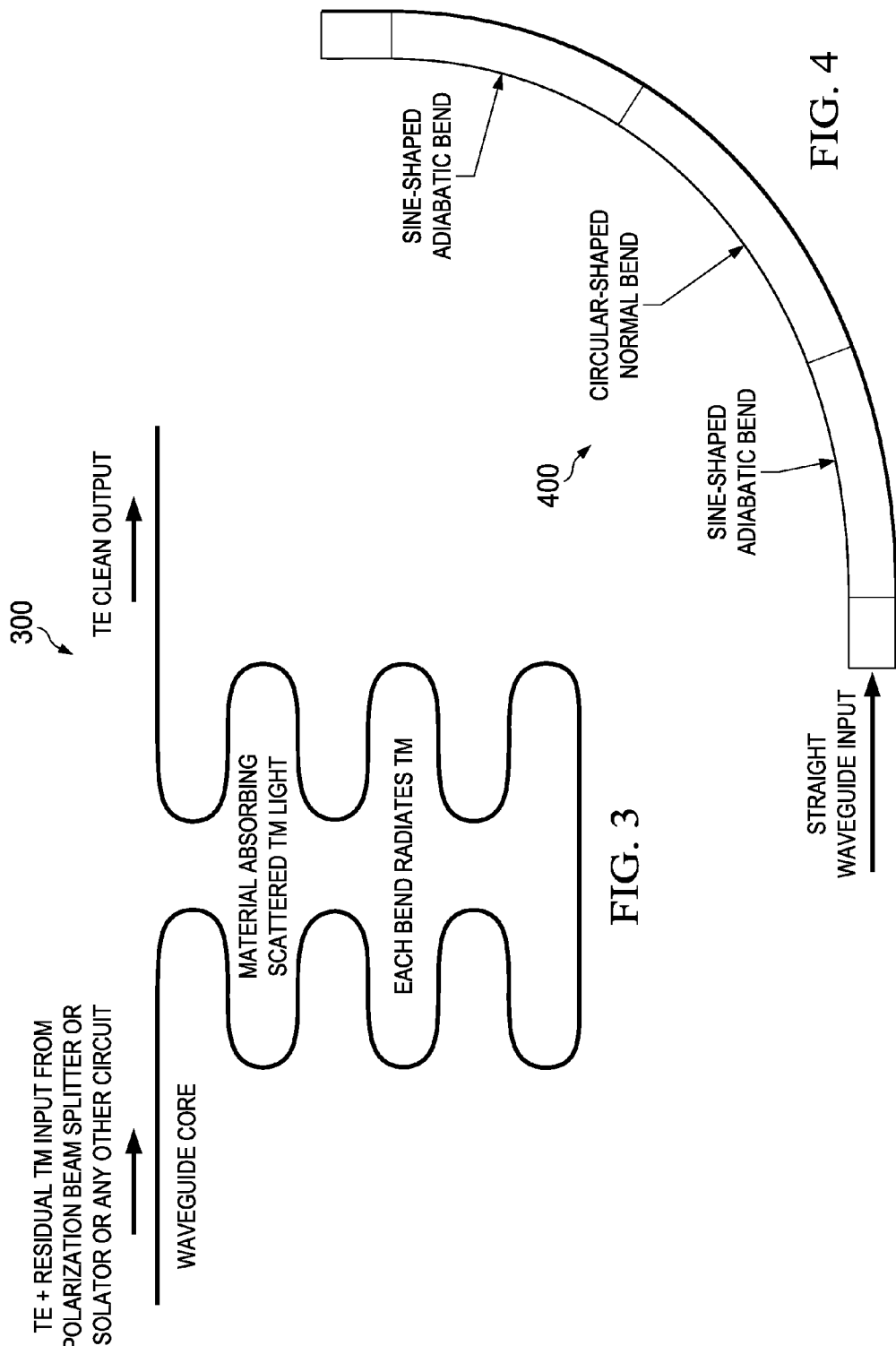

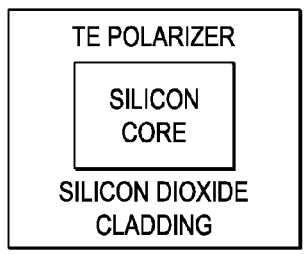

FIG. 5

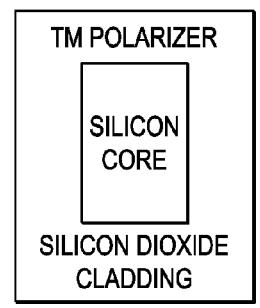

710 — FORM A WAVEGUIDE OF THE PHOTONIC CIRCUIT OR OPTICAL DEVICE USING SEMICONDUCTOR FABRICATION PROCESSES. THE FORMING STEP INCLUDES CONFIGURING THE WAVEGUIDES GEOMETRY AND DIMENSIONS TO SUPPORT A TE, TM, OR OTHER DESIRED POLARIZATION MODES, e.g., ACCORDING TO A DESIRED OPERATION WAVELENGTH

720 — AS PART OF FORMING THE WAVEGUIDE, FORM A SERIES OF BENDS IN THE WAVEGUIDE TO CLEAN UP THE DESIRED POLARIZATION MODE OF THE WAVEGUIDE. THE WAVEGUIDE CAN INCLUDE MULTIPLE BENDS WITH DIFFERENT SHAPES

730 — PLACE A LIGHT ABSORBING MATERIAL AROUND THE WAVEGUIDE AND THE BENDS OF THE WAVEGUIDE, e.g., ON THE CARRIER OF SUBSTRATE OF THE PHOTONIC CIRCUIT

FIG. 7

APPARATUS AND METHOD FOR A WAVEGUIDE POLARIZER COMPRISING A SERIES OF BENDS

TECHNICAL FIELD

The present invention relates to the field of optical communications, and, in particular embodiments, to an apparatus and method for a waveguide polarizer comprising a series of bends.

BACKGROUND

Silicon wire waveguides are used as a platform for ultra-small photonic integrated circuits (PICs). In a typical structure, a silicon core with high refractive index is surrounded by a low refractive index material (referred to as cladding) such as silicon dioxide, or sometimes silicon nitride, silicon oxynitride, or air. This structure forms an optical waveguide, typically used at communications wavelengths such as 1310 nm or 1550 nm bands. Silicon PIC chips include a lithographically-defined layout of single mode and multimode waveguide elements, which form a photonic circuit. In some photonic integrated circuits, the output of photonic cells is intended to contain a single polarization (e.g., as opposed to other circuits with two orthogonal polarizations). However, due to manufacturing tolerances or due to intrinsic electro-magnetic properties of the cells, the output light may contain a fraction of an unwanted polarization other than the desired single polarization. Thus, it is desirable to add a polarization component to the waveguide structure or PIC chip. Further, it is desirable to form the polarization component with the waveguide structure or PIC chip using the same manufacturing platform.

SUMMARY OF THE INVENTION

In accordance with an embodiment of the disclosure, an optical polarizer comprises an optical waveguide configured to propagate light at a designated polarization mode, and comprising a bend in a same plane as the propagated light. The bend has a geometry configured to contain in the optical waveguide the designated polarization mode of the propagated light and radiate outside the optical waveguide a second polarization mode of the propagated light.

In accordance with another embodiment of the disclosure, an optical device comprises an optical waveguide configured to propagate light in a designated polarization mode. The optical device further comprises a bent waveguide coupled to the optical waveguide, and configured with a bent geometry to contain in the bent waveguide the designated polarization mode of the propagated light and radiate outside the bent waveguide a second polarization mode of the propagated light.

In accordance with yet another embodiment of the disclosure, a method for making a polarizer device includes forming an optical waveguide on a substrate using semiconductor fabrication processes. The forming includes shaping a geometry and dimensions of the optical waveguide to support a designated polarization mode for light propagation according to a desired operation wavelength. The method further includes forming a series of bends in the waveguide during the semiconductor fabrication processes. The forming includes shaping a geometry and dimensions of the bends to contain the designated polarization mode within the waveguide and radiate outside the waveguide a second polarization mode. The method also includes placing, on the substrate, a light absorbing material around the waveguide and the bends of the waveguide.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which:

FIG. 3 illustrates an embodiment of a polarizer design;

FIG. 4 is a top plane view of an embodiment of a bend design for a polarizer;

FIG. 5 illustrates a cross section of an embodiment of a transverse electrical (TE) polarizer design;

FIG. 6 illustrates a cross section of an embodiment of a transverse magnetic (TM) polarizer design; and FIG. 7 illustrates an embodiment of a fabrication method of a polarization device comprising a series of bends.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
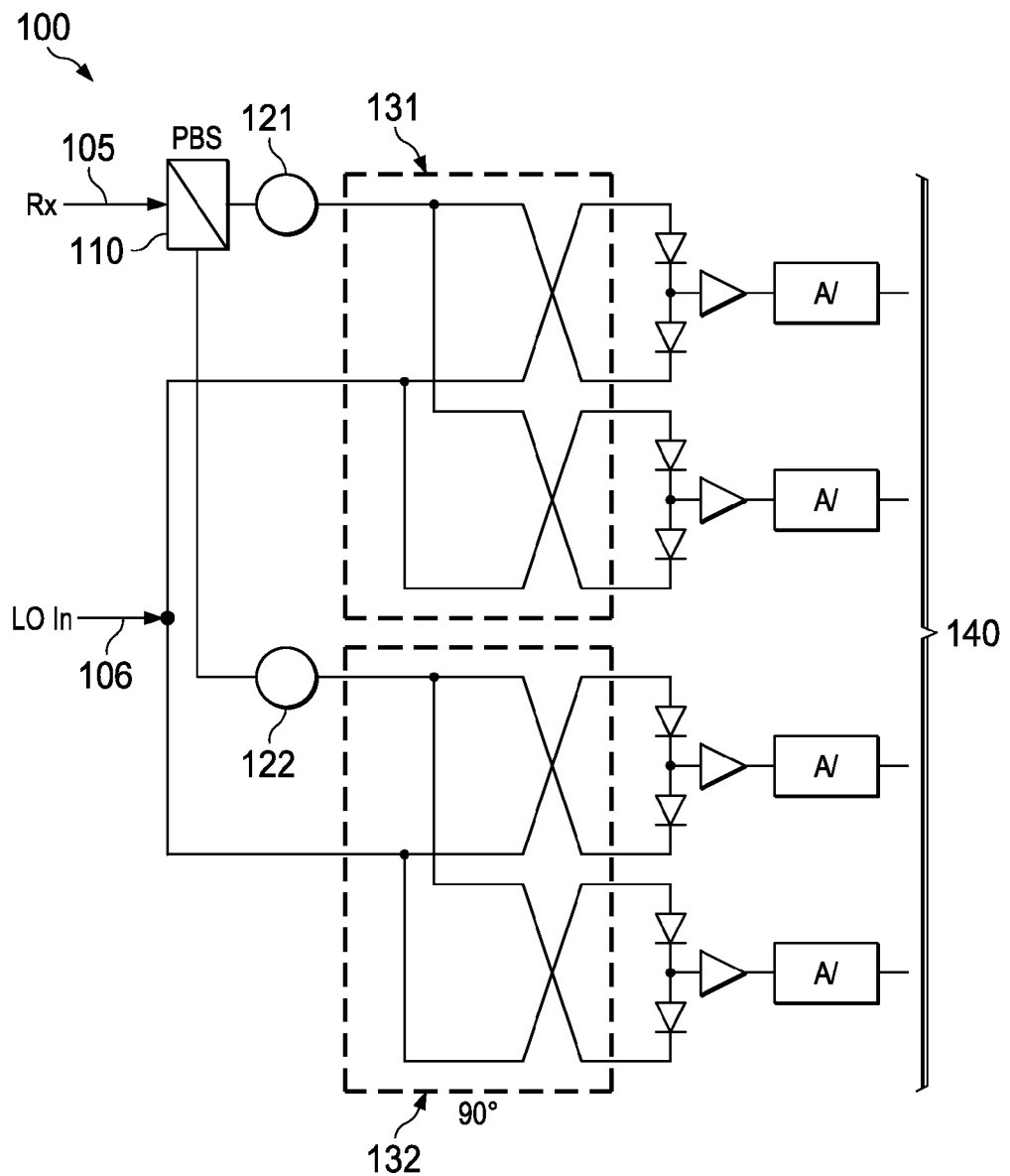
FIG. 1 illustrates an example of an optical receiver comprising a polarizer.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Embodiments are provided herein for a waveguide polarizer comprising a series of bends. The waveguide polarizer can be used in optical waveguide devices (or chips/circuits), where a polarized light is required, such as for single polarization output. The polarizer design is independent of the function of the optical devices. For example, the polarizer can be used in optical modulators, switches, multiplexers, or demultiplexers. Such devices and other polarized light devices can include single mode waveguides where light needs to propagate only in a mode that has the transverse electrical (TE) polarization, such as the TE0 mode which is the lowest-order waveguide mode. In this case, the polarizer is designed to reject transverse magnetic TM polarized light, such as the TM0 mode. Another polarizer design is also presented for the TM polarization mode. For instance, the polarizer may convert a mode that has a hybrid polarization, such as a mode with 45-degree polarization, into a linearly polarized mode such as the TE0 mode or the TM0 mode, by rejecting the fraction of the light that is respectively TM polarized or TE polarized. All polarizer designs comprise one or more bends that cause the light to become polarized along a desired direction, and can be fabricated with the light waveguide device within the same manufacturing processes (e.g., lithographic processes on the same substrate or board) of the optical device. While the embodiments are described in terms of silicon-based fabrication, the schemes also apply to other materials systems, such as gallium arsenide (GaAs), indium phosphide (InP), lithium niobate (LiNbO3), lead lanthanum zirconium titanate (PLZT), and silicon nitride (SiN).

The polarizer designs can be built using lithographic patterning without requiring an unusually narrow width of waveguide, and without introducing new manufacturing steps, since the bends are similar to other waveguide bends that may be needed in the photonic integrated circuits. Examples of polarization-diverse photonic circuits that can comprise such waveguide bends for polarization include an optical fiber input containing orthogonal (X and Y) polarized light on a given optical carrier, a polarization splitting cell that converts the input X and Y polarizations into the TE mode of two respective optical waveguides, a polarization combining output cell that performs the inverse function of the polarization splitting cell, and a polarization diverse core with two TE mode optical waveguide circuits, which are typically identical and each performing an optical function such as detection, modulation or switching. The two circuits act respectively on the orthogonal (X and Y) polarized light from the fiber.

FIG. 1 shows an optical receiver 100 which can include a polarizer according the embodiments of the disclosure. An incoming light beam 105 contains light of two orthogonal polarizations X and Y. The receiver 100 can be a coherent receiver including a polarizing beam splitter (PBS) 110. The PBS 110 comprises a polarization-splitting surface grating coupler, which splits the incoming light beam 105, for instance in the TE mode, into its two orthogonally polarized portions (X and Y polarized light beams) onto two corresponding paths: a first path coupled to a first waveguide circuit 131 and a second path coupled to a second waveguide circuit 132. Each of the circuits 131 and 132 comprises similar waveguides configured for the TE mode. However, the waveguides in the second waveguide circuit 132 are rotated at 90 degree with respect to the waveguides in the first circuit 131. As such, the X polarized light from the PBS 110 can be matched to the TE mode in the waveguides of the first circuit 131, and the orthogonal Y polarized light from the PBS 110 can be matched to the TE mode in the waveguides of the second waveguide circuit 132. The two circuits 131 and 132 are coupled to a detection array 140 for converting the optical signals into electrical signals. The circuits 131 and 132 also mix light 106 from a local oscillator laser (Lo In) with the signal light 105, if the LO light 106 is also in the TE mode.

Due to manufacturing imperfections or intrinsic electromagnetic physics of the optical components, the polarized output light beams from the PBS 110 may contain some unwanted polarization. Thus, a first polarizer 121 can be inserted on the first path between the PBS 110 and the first waveguide circuit 131 to achieve a more pure TE mode containing only the light that was originally X polarized (with less unwanted polarization). Achieving this more pure polarization mode or removing other undesired polarizations in the light beam is referred to herein as cleaning up the polarization mode. Similarly, a second polarizer 122 can be inserted on the second path between the PBS 110 and the second waveguide circuit 132 to achieve a more pure TE mode containing only the light that was originally Y polarized. The second polarizer 122 can have the same design of the first polarizer 121.

Figure 2:
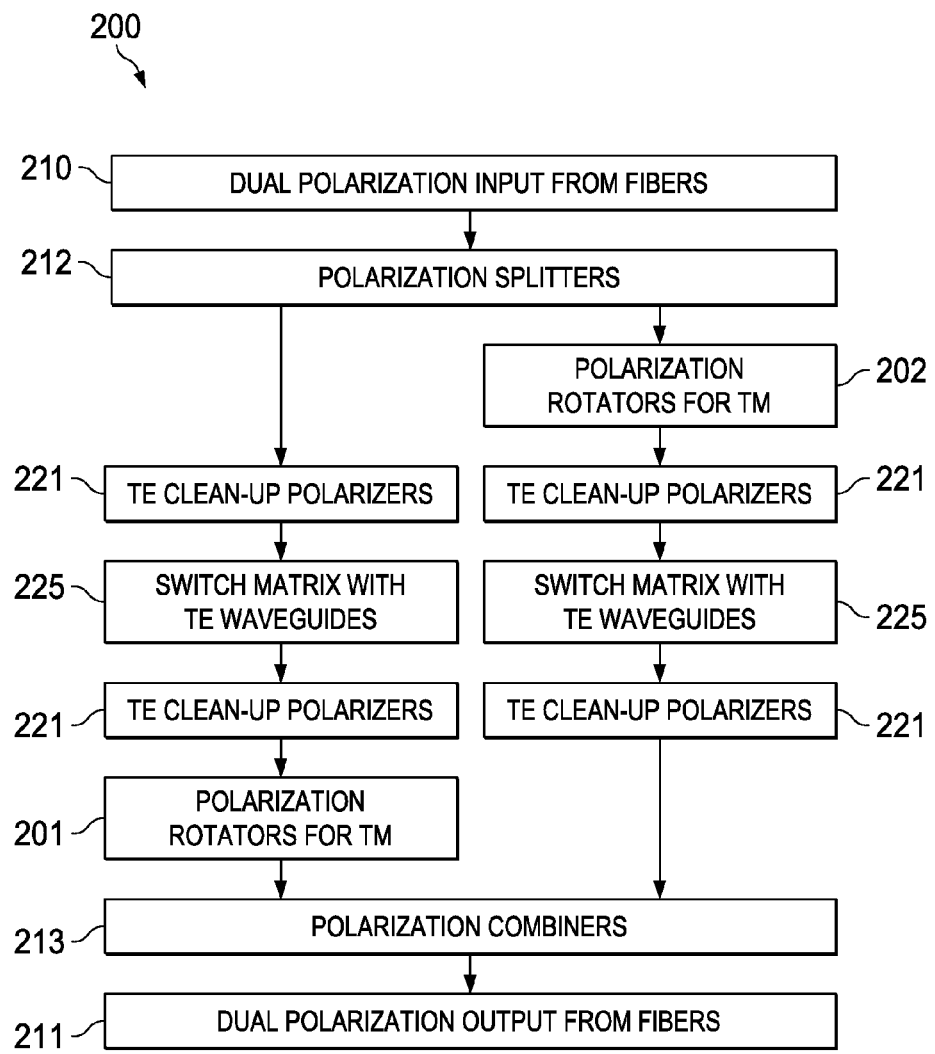
FIG. 2 illustrates an example of photonic switch chip comprising a polarizer.

FIG. 2 shows an example of a photonic switch chip 200 which can include a polarizer. The photonic switch chip 200 includes a plurality of fibers or waveguides 210 carrying an array of dual polarization input light beams (e.g., TE and TM mode polarized light) and a corresponding array or polarization splitters 212 coupled to the fibers 210. The chip 200 also includes a first switch matrix 225 of TE waveguides and a second similar switch matrix 225 also of TE waveguides, both coupled to the polarization splitters 212. The polarization splitters 212 splits the incoming light into the TE and TM modes and forwards each to one of the two switch matrices 225. For example, a polarization splitter 212 can be a directional coupler, a curved directional coupler, or a multi-mode interferometer element.

An array of polarization rotators 202 are positioned between the polarization splitters 212 and the input of the second switch matrix 225. For example, a polarization rotator 202 can be a waveguide with asymmetric cross-section. This allows rotating the incoming TM mode polarized light into orthogonal polarized light suitable for coupling into the TE modes of the waveguides in the second switch matrix 225. The outputs of both switch matrices 225 are coupled to an array of polarization combiners 213 that combine the corresponding incoming beams from the switch matrices 225 into dual polarization output light beams to another array of fibers 211. An array of second polarization rotators 201 are positioned between the polarization combiners 213 and the output of the first polarization switch matrix 225. This allows rotating the TE mode polarized light from the first switch matrix 225 into orthogonal polarized light suitable for coupling into the TM mode of the polarization combiners 213. The TM modes are then combined, at the polarization combiners 213, with the TE modes received from the second switch matrix 225. Additionally, TE clean-up polarizers 221 can be added at any one or more of the inputs and outputs of the switch matrices 225 as shown. The added polarizers 221 clean up the polarization of the light beams at the inputs and outputs of the switch matrices 225.

As described above, the polarizers 121, 122, and 221 clean up the polarization mode of the light beams and improve performance of the optical device. The polarizers provide a polarization-clean signal which avoids polarization crosstalk, inaccurate detection of optical power, multipath propagation crosstalk, or other undesired optical penalties. FIG. 3 shows an embodiment of a polarization design 300 for a polarizer such as the polarizers 121, 122, and 221. The design 300 is low-loss waveguide polarizer comprising a single-mode optical waveguide having a series of bends. The waveguide may be a silicon waveguide on an insulator, e.g., silicon dioxide (also referred to as silica), on a substrate (e.g., silicon substrate). The bends are designed to have low loss for the intended mode of light of the intended polarization. Additionally in embodiments, the bends can be further designed to have high loss for modes of the orthogonal polarization or other modes than the desired polarization mode. The bends and the waveguide sections between bends are all in the same plane of the intended mode. As shown, the waveguide comprises a series of bends having a serpentine shape. In other embodiments, the bent waveguide comprises a series of bends having one or a combination of a serpentine shape, a double serpentine shape, and a spiral shape.

The waveguide and its bends can be designed to have low loss for the TE polarization mode and high loss for the TM polarization mode. This mode selection can be achieved be designing the bend to substantially contain the TE mode within the waveguide and radiate the TM mode outside the waveguide. The bend and the waveguide lie in the same plane as the contained TE mode and radiated TM mode. The waveguide can be further surrounded by a suitable absorbing material to prevent the radiated TM mode of re-entering the waveguide (e.g., at a different waveguide section). The bend geometries can include an arc-of-a-circle bend, a Bezier bend, a sine-shaped bend, other suitable bend or curve geometries, or combinations thereof. The waveguide can comprise silicon at the core (where light propagates) and silicon dioxide as the cladding around the silicon core. The cladding ensures confinement of the light as it propagates inside the waveguide core, by internal reflection of light at the interface between cladding and core. In other embodiments, other suitable materials that are used in the other chip components can also be used for the core and cladding of the waveguide polarizer.

The bends can be arranged in a serpentine or zig-zag layout, comprising 90 degree bends or 180 degree bends (as shown in FIG. 3) with a straight region or a gently-curved region between the bends. To prevent the TM mode light from coupling back into the next cycle of the serpentine layout in the design 300, an absorbing region is placed in the gap between each cycle of the serpentine layout. Examples of the absorbing material include germanium and/or heavily-doped-silicon layers, which are typically used in silicon photonic chip manufacturing.

Table 1 illustrates design examples for the polarizer with multiple bends. The table data compare between a Bezier adiabatic bend and a custom adiabatic bend having a sine-circle-sine design as described further below. As used herein, the term adiabatic bend or adiabatic section represents a bend structure or section with a radius of curvature that changes smoothly and slowly without any discontinuity or abrupt change, which minimizes the optical loss at the bend. A bend that includes a discontinuity in the radius of curvature can cause undesirable optical scattering at the discontinuity. The width of the silicon waveguide is 0.45 micrometers ($\mu$m) in all cases of Table 1. With the design parameters in Table 1, simulations results show that a sine-shaped bend of 3 $\mu$m radius would have a loss of 0.007 dB for TE and 0.86 dB for TM. As such, a series of 20 bends would have a loss of 0.14 dB for TE and 17 dB for TM, and the polarizer would have 0.14 dB insertion loss and 17 dB polarization extinction. Different values of insertion loss, polarization extinction and physical size can be achieved using different numbers of bends, different bend radius, and different bend shape. The bends may be all the same or may vary along the length of the device.

TABLE 1

Comparison of Bezier adiabatic bend and the custom adiabatic bend

| Characteristic bend radius | | Loss(dB) | Bezier bend (Bezier number = 0.3) | Custom bend ($L_{max}$ = 4 $\mu$m) |
|---|---|---|---|---|
| R = 3 um | | TE | 0.037 | 0.007 |
| | | TM | 1.397 | 0.858 |
| R = 5 um | | TE | 0.012 | 0.006 |
| | | TM | 0.332 | 0.132 |
| R = 10 um | | TE | 0.015 | 0.003 |
| | | TM | 0.023 | 0.008 |

FIG. 4 is a top plane view of an embodiment of a sine-circle-sine bend design 400 of the polarizer, e.g., on a substrate. The bend design 400 corresponds to the custom adiabatic bend above. The bend can comprise different bend shapes at different sections. The shapes include two sine-shaped adiabatic bend sections at the edges of the bend in contact with waveguides, and a circular-shaped bend between the two sine-shaped adiabatic bends. The resulting design form an overall 90 degree bend. Other designs can include other combinations of bend shaped sections for other bending angles.

FIG. 5 shows a cross section of an embodiment of a TE polarizer design 500, e.g., with a substrate at the bottom (not shown). The polarizer is a waveguide comprising one or more bends to ensure low loss of TE0 and high loss of TM0 as described above. The cross section shows a rectangular cross section profile waveguide with a larger width than height. The waveguide has a silicon core and a silicon dioxide cladding. Similarly, a bend can be designed to achieve low loss for TM0 and high loss for TE0, and used as a TM polarizer. FIG. 6 shows a cross section of an embodiment of a TM polarizer design 600. The polarizer is a waveguide comprising one or more bends to ensure low loss of TM0 and high loss of TE0. The cross section shows a rectangular profile waveguide with a larger height than width. The waveguide has a silicon core and a silicon dioxide cladding.

FIG. 7 shows an embodiment of a fabrication method 700 of a polarization device (waveguide polarizer) comprising a series of bends. The method 700 can be used to form the polarizers described above as an integrated part of the fabrication process of the entire photonic circuit or optical device. At step 710, a waveguide of the photonic circuit or optical device is formed using semiconductor fabrication processes. The forming step includes configuring the waveguides geometry and dimensions to support a TE, TM, or other desired polarization modes, e.g., according to desired operation wavelengths. For example, a silicon core waveguide with silicon dioxide cladding can be formed on a silicon or dielectric substrate using lithographic exposure and etching processes. At step 720, a series of bends are formed in the waveguides to clean up the desired polarization mode of the waveguide. The bends can have different shapes, as described above. This step can be part of the waveguide forming step. For example, the entire design including waveguides and bends is exposed, then developed, then etched. At step 730, a light absorbing material (a filling material) is placed around the waveguide and the bends of the waveguide, e.g., on the carrier of substrate of the photonic circuit.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An optical receiver comprising:
a first optical waveguide configured to propagate light in a designated polarization mode, and comprising at least a first bend and a second bend in a plane of the propagated light,
wherein the first bend has a geometry configured to contain in the first optical waveguide the designated polarization mode of the propagated light and radiate outside the first optical waveguide a second polarization mode of the propagated light, and wherein the first bend is between 90 degrees and 180 degrees, wherein at least one of the first bend and the second bend has a double serpentine shape.

2. The optical receiver of claim 1, wherein the second polarization mode is orthogonal to the designated polarization mode.

3. The optical receiver of claim 1, wherein the designated polarization mode is a transverse electrical (TE) mode, and wherein the second polarization mode is a transverse magnetic (TM) mode.

4. The optical receiver of claim 1, wherein the geometry of the first bend is one of circular, adiabatic, Bezier curve shaped, and sine curve shaped.

5. The optical receiver of claim 1, wherein the geometry of the first bend comprises a first adiabatic sine curve coupled to a straight waveguide section, a constant radius turn coupled to the first adiabatic sine curve, and a second adiabatic sine curve coupled to the constant radius turn and to a second straight waveguide section.

6. The optical receiver of claim 1, wherein the first bend is a 90 degree bend in the first optical waveguide.

7. The optical receiver of claim 1, wherein the first bend is a 180 degree bend in the first optical waveguide.

8. The optical receiver of claim 1, wherein the first optical waveguide including the first bend comprises a core of silicon.

9. The optical receiver of claim 8, wherein the first optical waveguide including the first bend comprises a cladding of silicon oxide surrounding the core.

10. The optical receiver of claim 1, wherein the first optical waveguide including the first bend is comprised of silicon on an insulator substrate.

11. An optical receiver comprising:
an optical waveguide configured to propagate light at a desired polarization mode; a bent waveguide coupled to the optical waveguide, and configured with a bent geometry to contain in the bent waveguide the desired polarization mode of the propagated light and radiate outside the bent waveguide a second polarization mode of the propagated light;
a polarizing beam splitter (PBS) coupled to the optical waveguide via the bent waveguide, wherein the bent waveguide is a polarizer for a first light mode from the PBS to the optical waveguide;
a second optical waveguide similar to the optical waveguide coupled to the PBS; and
a second bent waveguide similar to the bent waveguide, wherein the second bent waveguide is positioned between the PBS and the second optical waveguide, and is a polarizer for a second light mode from the PBS to the second optical waveguide.

12. The optical receiver for claim 11, wherein the desired polarization mode is a transverse electrical (TE) mode, and wherein the bent waveguide has a rectangular cross section profile with a larger width than height.

13. The optical receiver for claim 11, wherein the desired polarization mode is a transverse magnetic (TM) mode, and wherein the bent waveguide has a rectangular cross section profile with a larger height than width.

14. The optical receiver of claim 11, wherein the optical waveguide and the bent waveguide are fabricated via a same sequence of lithographic processes using same semiconductor and dielectric materials.

15. The optical receiver of claim 11, wherein the bent waveguide comprises a series of bends having one of a serpentine shape and a double serpentine shape.

16. The optical receiver of claim 11, wherein the bent waveguide is surrounded with a light-absorbing material.

17. The optical receiver of claim 16, wherein the light-absorbing material is one of germanium and doped silicon on a substrate.

18. An optical device comprising:
an optical waveguide configured to propagate light at a desired polarization mode; a bent waveguide coupled to the optical waveguide, and configured with a bent geometry to contain in the bent waveguide the desired polarization mode of the propagated light and radiate outside the bent waveguide a second polarization mode of the propagated light;
a polarization splitter; and
a switch matrix comprising the optical waveguide and coupled to the polarization splitter via the bent waveguide, wherein the bent waveguide is a polarizer for a transverse electrical mode between the polarization splitter and the switch matrix.

19. The optical device of claim 18, wherein the optical device further comprises a polarization rotator positioned between the bent waveguide and the polarization splitter.

20. An optical device comprising:
a first optical waveguide configured to propagate light at a first polarization mode; and
a first bent waveguide having a bent geometry and coupled to the first optical waveguide, the first bent waveguide configured to contain in the first polarization mode of the propagated light inside the first bent waveguide, and to radiate outside the first bent waveguide a second polarization mode of the propagated light, wherein the bent geometry comprises a first adiabatic sine curve coupled to a straight waveguide section, a constant radius turn coupled to the first adiabatic sine curve, and a second adiabatic sine curve coupled in between the constant radius turn and a second straight waveguide section.

21. The optical device of claim 20, further comprising:
a polarizing beam splitter (PBS) coupled to the first optical waveguide via the first bent waveguide, wherein the first bent waveguide is a polarizer for a first light mode from the PBS to the first optical waveguide;
a second optical waveguide having a cross-section similar to a cross-section of the first optical waveguide and rotated by 90 degrees with respect to the cross-section of the first optical waveguide, wherein the second optical waveguide is coupled to the PBS; and
a second bent waveguide having a cross-section similar to a cross-section of the first bent waveguide and rotated by 90 degrees with respect to the cross-section of the first bent waveguide, wherein the second bent waveguide is positioned between the PBS and the rotated second optical waveguide, and is a polarizer for a second light mode from the PBS to the second optical waveguide.

22. The optical receiver of claim 1, further comprises:
a polarizing beam splitter (PBS) coupled to the first optical waveguide via the first bend, wherein the first bend is a polarizer for a first light mode from the PBS to the first optical waveguide;
a second optical waveguide similar to the first optical waveguide and having a cross-section rotated by 90 degrees with respect to a cross-section of the first optical waveguide, wherein the second optical waveguide is coupled to the PBS; and
a second bend similar to the first bend and having a cross-section rotated by 90 degrees with respect to a cross-section of the first bend, wherein the second bend is positioned between the PBS and the second optical waveguide, and is a polarizer for a second light mode from the PBS to the second optical waveguide.

* * * * *